United States Patent
Ong et al.

(10) Patent No.: US 12,089,133 B2
(45) Date of Patent: Sep. 10, 2024

(54) PATH OPTIMIZATION IN A MESH NETWORK

(71) Applicant: Comcast Cable Communications, LLC, Philadelphia, PA (US)

(72) Inventors: Ivan Ong, Malvern, PA (US); David J. Urban, Downingtown, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 18/458,721

(22) Filed: Aug. 30, 2023

(65) Prior Publication Data
US 2024/0098617 A1  Mar. 21, 2024

Related U.S. Application Data

(63) Continuation of application No. 16/530,066, filed on Aug. 2, 2019, now Pat. No. 11,778,533.

(51) Int. Cl.
  *H04W 40/12*  (2009.01)
  *H04W 74/0808*  (2024.01)
  *H04W 80/02*  (2009.01)
  *H04W 84/18*  (2009.01)

(52) U.S. Cl.
  CPC ....... *H04W 40/12* (2013.01); *H04W 74/0808* (2013.01); *H04W 80/02* (2013.01); *H04W 84/18* (2013.01)

(58) Field of Classification Search
  None
  See application file for complete search history.

(56) References Cited

U.S. PATENT DOCUMENTS

| | | |
|---|---|---|
| 2004/0246975 A1 | 12/2004 | Joshi |
| 2007/0147255 A1 | 6/2007 | Oyman |
| 2008/0137585 A1* | 6/2008 | Loyola ............... H04L 1/06 370/315 |
| 2008/0310348 A1 | 12/2008 | Nandagopalan et al. |
| 2009/0097432 A1* | 4/2009 | Kwon ............... H04W 40/02 370/315 |
| 2009/0290528 A1 | 11/2009 | Kwon et al. |
| 2010/0020739 A1 | 1/2010 | Chou et al. |
| 2010/0329131 A1* | 12/2010 | Oyman ............... H04W 74/085 370/252 |
| 2011/0310860 A1* | 12/2011 | Denteneer ............ H04W 74/04 370/336 |
| 2012/0307673 A1 | 12/2012 | Chang et al. |

(Continued)

FOREIGN PATENT DOCUMENTS

CN  102202382 A  9/2011

*Primary Examiner* — Andre Tacdiran
(74) *Attorney, Agent, or Firm* — Banner & Witcoff, Ltd.

(57) ABSTRACT

Described herein are systems, methods, and apparatuses for determining an optimal path in a mesh network. A preemptive message, such as a request to send (RTS) message, carrying, for example, an address of a target mobile device, may be sent from an access point to a computing device in a mesh network. The computing device may relay the RTS to the target mobile device. A clear to send (CTS) message and transmission parameters indicating channel conditions may be transmitted from the target mobile device to the access point via the computing device. The access point may determine an optimal path based on the transmission parameters and send data via the optimal path.

30 Claims, 7 Drawing Sheets

(56) References Cited

U.S. PATENT DOCUMENTS

| | | |
|---|---|---|
| 2013/0039201 A1 | 2/2013 | Kwon et al. |
| 2013/0121337 A1* | 5/2013 | Nguyen .................. H04L 45/70 370/410 |
| 2013/0235745 A1* | 9/2013 | Zhang .................. H04W 72/54 370/252 |
| 2013/0336196 A1 | 12/2013 | Abraham et al. |
| 2014/0370802 A1 | 12/2014 | Chang et al. |
| 2015/0163129 A1 | 6/2015 | Hong et al. |
| 2015/0358067 A1 | 12/2015 | Zhang et al. |
| 2016/0373223 A1 | 12/2016 | Quick, Jr. |
| 2017/0026162 A1 | 1/2017 | Nabetani et al. |
| 2017/0244468 A1 | 8/2017 | Zhao |
| 2017/0289845 A1 | 10/2017 | Chiu et al. |
| 2018/0049129 A1* | 2/2018 | Li ....................... H04W 52/0235 |
| 2018/0077725 A1* | 3/2018 | Sun ....................... H04W 28/26 |
| 2018/0176747 A1* | 6/2018 | Li ....................... H04W 52/325 |
| 2019/0190887 A1 | 6/2019 | Yan |
| 2021/0036949 A1 | 2/2021 | Antonyraj et al. |
| 2021/0067284 A1 | 3/2021 | Cerovic et al. |
| 2021/0409307 A1 | 12/2021 | Akerberg et al. |

\* cited by examiner

PATH OPTIMIZATION IN A MESH NETWORK

CROSS-REFERENCE TO RELATED APPLICATIONS

This application is a continuation of and claims priority to U.S. patent application Ser. No. 16/530,066, filed Aug. 2, 2019, which is hereby incorporated by reference in its entirety.

BACKGROUND

In an enterprise mesh network, route optimization may be based on historical environmental transmission variables managed by a controller or locally on the mesh node. Collision may frequently occur if multiple mesh nodes attempt to transmit at the same time. Wireless standards, such as IEEE 802.11 DCF protocol, may employ pre-emptive messaging, such as Request-to-Send (RTS) and Clear-to-Send (CTS) messages, so that two nodes check to ensure that a channel is free before committing to sending data on the channel. In a mesh network, if the nodes are separated by one or more intermediate nodes, the RTS/CTS messaging may cause delay in communications between the nodes, as separate RTS/CTS messaging takes place for each intermediate node. Additionally, if a connection with one of the intermediate nodes were to fail, the original node might not be made aware of the particular point of failure. These and other shortcomings are addressed by the present disclosure.

SUMMARY

Systems, apparatuses, and methods are described herein to allow pre-emptive request messages, such as RTS messages, to be relayed through intermediate nodes on a path between a source node and a target node, and to have intermediate nodes delay sending their own pre-emptive response messages, such as CTS messages, until after they receive a response to their own relayed RTS message. In this way, an RTS message may reach the target node more quickly than if each intermediate node were required to send an immediate CTS response to its preceding node in the path.

Each CTS response may indicate whether CTS responses were received from nodes downstream in the path (towards the target node). Accordingly, the final CTS response received by the source node may contain indications of conditions of all nodes along the path. If there is a failure at any of the nodes, and the failed node does not send a CTS response to an upstream node in the path, that upstream node may send a CTS response indicating this failure to its own preceding node along the path. The source node may receive a CTS response indicating which intermediate nodes were successful, and which ones were not, along the path to the target node. The source node may use this path information to determine a best route to the target node.

The source node may receive many CTS messages from multiple intermediate mesh nodes that begin multiple different paths leading to the target node. Based on transmission parameters in the CTS messages, the source node may select a most efficient and least disruptive network path to transmit the data frames to the target node via one or more of the intermediate mesh nodes.

These and other features and advantages are described in greater detail below. The preceding summary presents a simplified summary of certain features. The summary is not an extensive overview and is not intended to identify key or critical elements.

BRIEF DESCRIPTION OF THE DRAWINGS

Some features herein are shown by way of example, and not by way of limitation, in the figures of the accompanying drawings and in which like reference numerals refer to similar elements.

DETAILED DESCRIPTION

Figure 1:
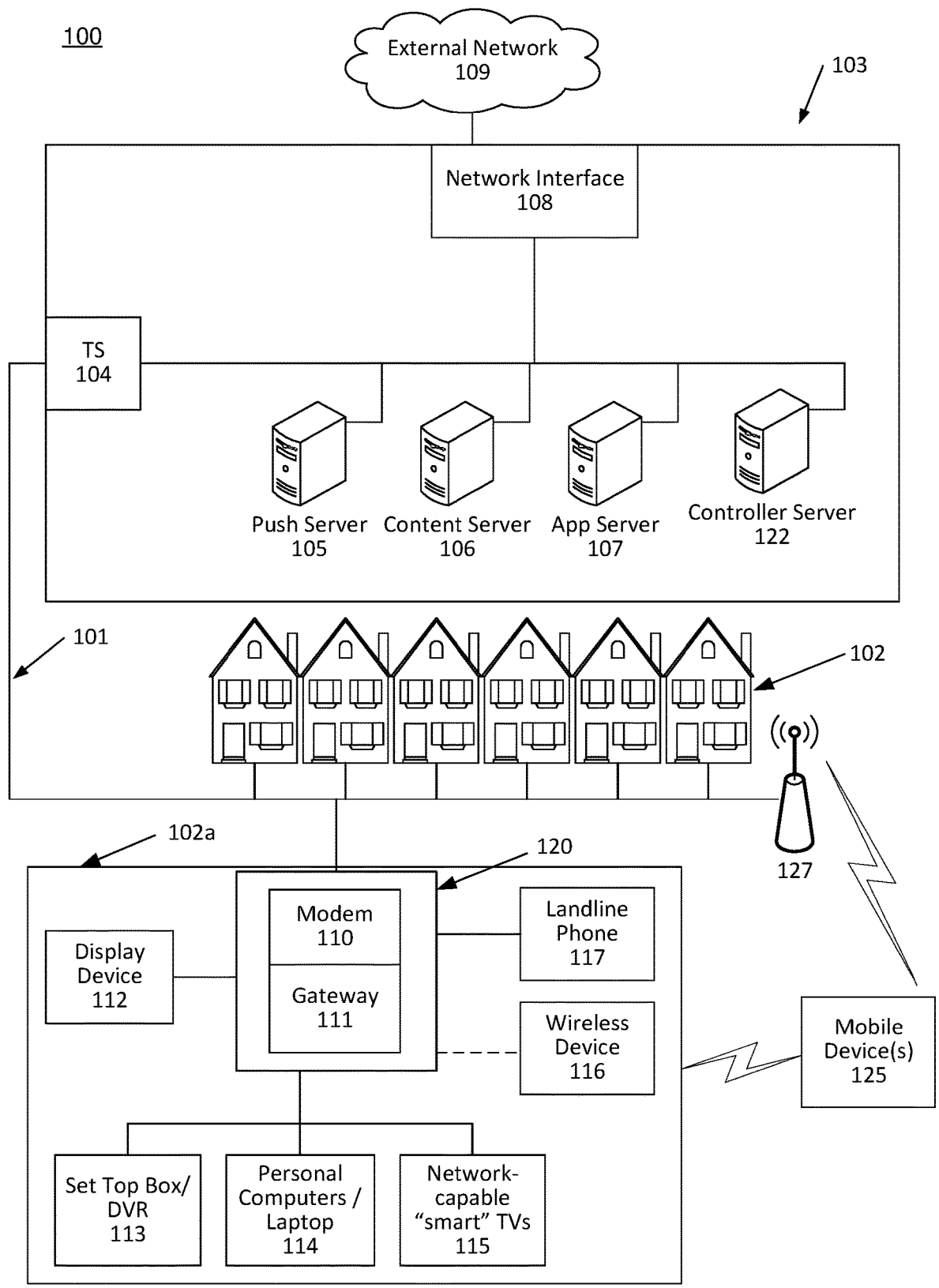
FIG. 1 shows an example communication network in which various features described herein may be implemented.

The accompanying drawings, which form a part hereof, show examples of the disclosure. It is to be understood that the examples shown in the drawings and/or discussed herein are non-exclusive and that there are other examples of how the disclosure may be practiced.

FIG. 1 shows an example communication network 100 in which features described herein may be implemented. The communication network 100 may be any type of information distribution network, such as satellite, telephone, cellular, wireless, etc. Examples may include an optical fiber network, a coaxial cable network, and/or a hybrid fiber/coax distribution network. The communication network 100 may use a series of interconnected communication links 101 (e.g., coaxial cables, optical fibers, wireless links, etc.) to connect multiple premises 102 (e.g., businesses, homes, consumer dwellings, train stations, airports, etc.) to a local office 103 (e.g., a headend). The local office 103 may transmit downstream information signals and receive upstream information signals via the communication links 101. Each of the premises 102 may have equipment, described below, to receive, send, and/or otherwise process those signals.

The communication links 101 may originate from the local office 103 and may be split to exchange information signals with the various premises 102. The communication links 101 may include components not shown, such as splitters, filters, amplifiers, etc. to help convey the signal clearly. The communication links 101 may be coupled to an access point 127 (e.g., a base station of a cellular network, a Wi-Fi access point, etc.) configured to provide wireless communication channels to communicate with one or more mobile devices 125. The mobile devices 125 may include cellular mobile devices, and the wireless communication channels may be Wi-Fi IEEE 802.11 channels, cellular channels (e.g., LTE), and/or satellite channels.

The local office 103 may include an interface 104, such as a termination system (TS). The interface 104 may be a cable modem termination system (CMTS), which may be a computing device configured to manage communications between devices on the network of the communication links 101 and backend devices such as servers 105-107 and 122. The interface 104 may be configured to place data on one or more downstream frequencies to be received by modems at the various premises 102, and to receive upstream communications from those modems on one or more upstream frequencies.

The local office 103 may also include one or more network interfaces 108 which may permit the local office 103 to communicate with various other external networks 109. The external networks 109 may include, for example, networks of Internet devices, telephone networks, cellular telephone networks, fiber optic networks, local wireless networks (e.g., WiMAX), satellite networks, and any other desired network, and the network interface 108 may include the corresponding circuitry needed to communicate on the external networks 109, and to other devices on the external networks. For example, the local office 103 may also or alternatively communicate with a cellular telephone network and its corresponding mobile devices 125 (e.g., cell phones, smartphone, tablets with cellular radios, laptops communicatively coupled to cellular radios, etc.) via the interface 108.

The push notification server 105 may generate push notifications to deliver data and/or commands to the various premises 102 in the network (or more specifically, to the devices in the premises 102 that are configured to detect such notifications). The content server 106 may be one or more computing devices that are configured to provide content to devices at premises. This content may be, for example, video on demand movies, television programs, songs, text listings, web pages, articles, news, images, files, etc. The content server 106 (or, alternatively, an authentication server) may include software to validate user identities and entitlements, to locate and retrieve requested content and to initiate delivery (e.g., streaming) of the content to the requesting user(s) and/or device(s). The application server 107 may be a computing device configured to offer any desired service, and may execute various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program listings. Another application server may be responsible for monitoring user viewing habits and collecting that information for use in selecting advertisements. Yet another application server may be responsible for formatting and inserting advertisements in a video stream being transmitted to the premises 102 (e.g., this application server may also be configured to perform some or all of the functions shown in FIG. 7 below). The local office 103 may include additional servers, including a controller server 122 (described below), additional push, content, and/or application servers, and/or other types of servers. Although shown separately, the push server 105, the content server 106, the application server 107, the controller server 122, and/or other server(s) may be combined. The servers 105, 106, 107, and 122, and/or other servers, may be computing devices and may include memory storing data and also storing computer executable instructions that, when executed by one or more processors, cause the server(s) to perform steps described herein.

An example premises 102a may include an interface 120. The interface 120 may include any communication circuitry used to communicate via one or more of the links 101. The interface 120 may include a modem 110, which may include transmitters and receivers used to communicate via the links 101 with the local office 103. The modem 110 may be, for example, a coaxial cable modem (for coaxial cable lines of the communication links 101), a fiber interface node (for fiber optic lines of the communication links 101), twisted-pair telephone modem, cellular telephone transceiver, satellite transceiver, local Wi-Fi router or access point, or any other desired modem device. One modem is shown in FIG. 1, but a plurality of modems operating in parallel may be implemented within the interface 120. The interface 120 may include a gateway interface device 111. The modem 110 may be connected to, or be a part of, the gateway interface device 111. The gateway interface device 111 may be a computing device that communicates with the modem(s) 110 to allow one or more other devices in the premises 102a, to communicate with the local office 103 and other devices beyond the local office 103. The gateway interface device 111 may comprise a set-top box (STB), digital video recorder (DVR), a digital transport adapter (DTA), computer server, network-capable "smart" TVs with embedded processors, and/or any other desired computing device. The gateway interface device 111 may also include local network interfaces to provide communication signals to requesting entities/devices in the premises 102a, such as display devices 112 (e.g., televisions), additional STBs or DVRs 113, personal computers/laptop 114, network-capable "smart" TVs, 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA), etc.), landline phones 117 (e.g., Voice over Internet Protocol—VoIP phones), wireless "smart" TVs, and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11, IEEE 802.15), analog twisted pair interfaces, Bluetooth interfaces, and others.

One or more of the devices at a premises 102a may be configured to provide wireless communications channels (e.g., IEEE 802.11 channels) to communicate with a mobile device 125. A modem 110 (e.g., access point) or a wireless device 116 (e.g., router, tablet, laptop, etc.) may wirelessly communicate with one or more mobile devices 125, which may be on- or off-premises.

Mobile devices 125 may communicate with a local office 103 including, for example, with the controller server 122. Mobile devices 125 may be cell phones, smartphones, tablets (e.g., with cellular transceivers), laptops (e.g., communicatively coupled to cellular transceivers), wearable devices (e.g., smart watches, electronic eye-glasses, etc.), or any other mobile computing devices. Mobile devices 125 may store, output, and/or otherwise use assets. An asset may be a video, a game, one or more images, software, audio, text, webpage(s), and/or other content. Mobile devices 125 may include Wi-Fi transceivers, cellular transceivers, satellite transceivers, and/or global positioning system (GPS) components.

Figure 2:
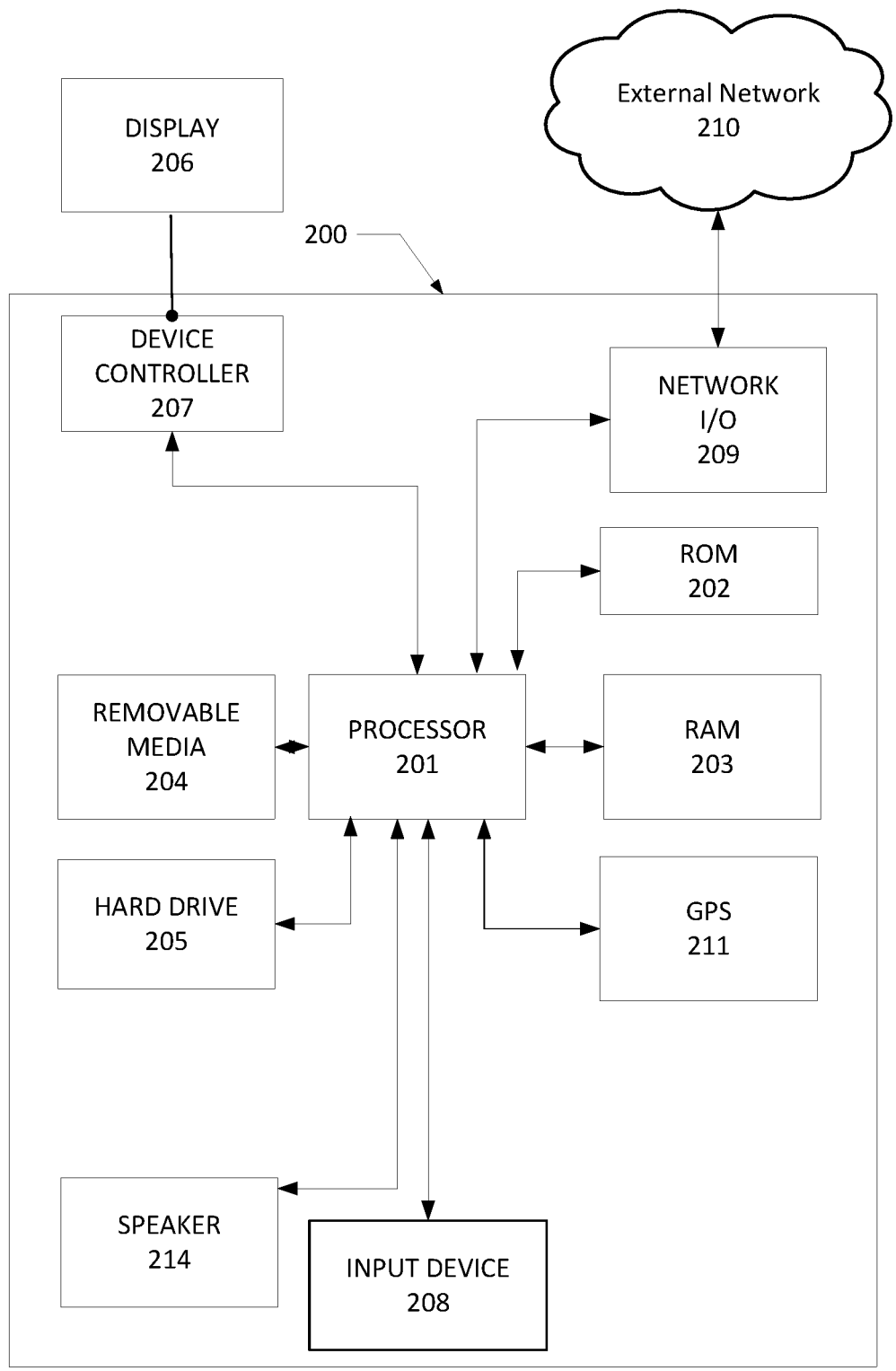
FIG. 2 shows hardware elements of a computing device that may be used to implement any of the elements described herein.

FIG. 2 shows hardware elements of a computing device that may be used to implement any of the computing devices discussed herein (e.g., the servers, devices, a controller server, end user device, receiving computing device, etc.). The computing device 200 may include one or more processors 201, which may execute instructions of a computer program to perform any of the functions described herein. The instructions may be stored in a read-only memory (ROM) 202, random access memory (RAM) 203, removable media 204 (e.g., a Universal Serial Bus (USB) drive, a compact disk (CD), a digital versatile disk (DVD)), and/or in any other type of computer-readable medium or memory. Instructions may also be stored in an attached (or internal) hard drive 205 or other types of storage media. The computing device 200 may include one or more output devices, such as a display 206 (e.g., an external television or other display device), and may include one or more output device controllers 207, such as a video processor. There may also be one or more user input devices 208, such as a remote control, keyboard, mouse, touch screen, microphone, etc. The computing device 200 may also include one or more network interfaces, such as a network input/output (I/O) circuit 209 (e.g., a network card) to communicate with an external network 210. The network input/output circuit 209 may be a wired interface, wireless interface, or a combination of the two. The network input/output circuit 209 may include a modem (e.g., a cable modem), and the external network 210 may include the communication links 101 discussed above, the external network 109, an in-home network, a network provider's wireless, coaxial, fiber, or hybrid fiber/coaxial distribution system (e.g., a DOCSIS network), or any other desired network. Additionally, the computing device 200 may include a location-detecting device, such as a global positioning system (GPS) microprocessor 211, which can be configured to receive and process global positioning signals and determine, with possible assistance from an external server and antenna, a geographic position of the computing device 200.

Although FIG. 2 shows an example hardware configuration, one or more of the elements of the computing device 200 may be implemented as software or a combination of hardware and software. Modifications may be made to add, remove, combine, divide, etc. components of the computing device 200. Additionally, the elements shown in FIG. 2 may be implemented using basic computing devices and components that have been configured to perform operations such as are described herein. For example, a memory of the computing device 200 may store computer-executable instructions that, when executed by the processor 201 and/or one or more other processors of the computing device 200, cause the computing device 200 to perform one, some, or all of the operations described herein. Such memory and processor(s) may also or alternatively be implemented through one or more Integrated Circuits (ICs). An IC may be, for example, a microprocessor that accesses programming instructions or other data stored in a ROM and/or hardwired into the IC. For example, an IC may comprise an Application Specific Integrated Circuit (ASIC) having gates and/or other logic dedicated to the calculations and other operations described herein. An IC may perform some operations based on execution of programming instructions read from ROM or RAM, with other operations hardwired into gates or other logic. Further, an IC may be configured to output image data to a display buffer.

Figure 3:
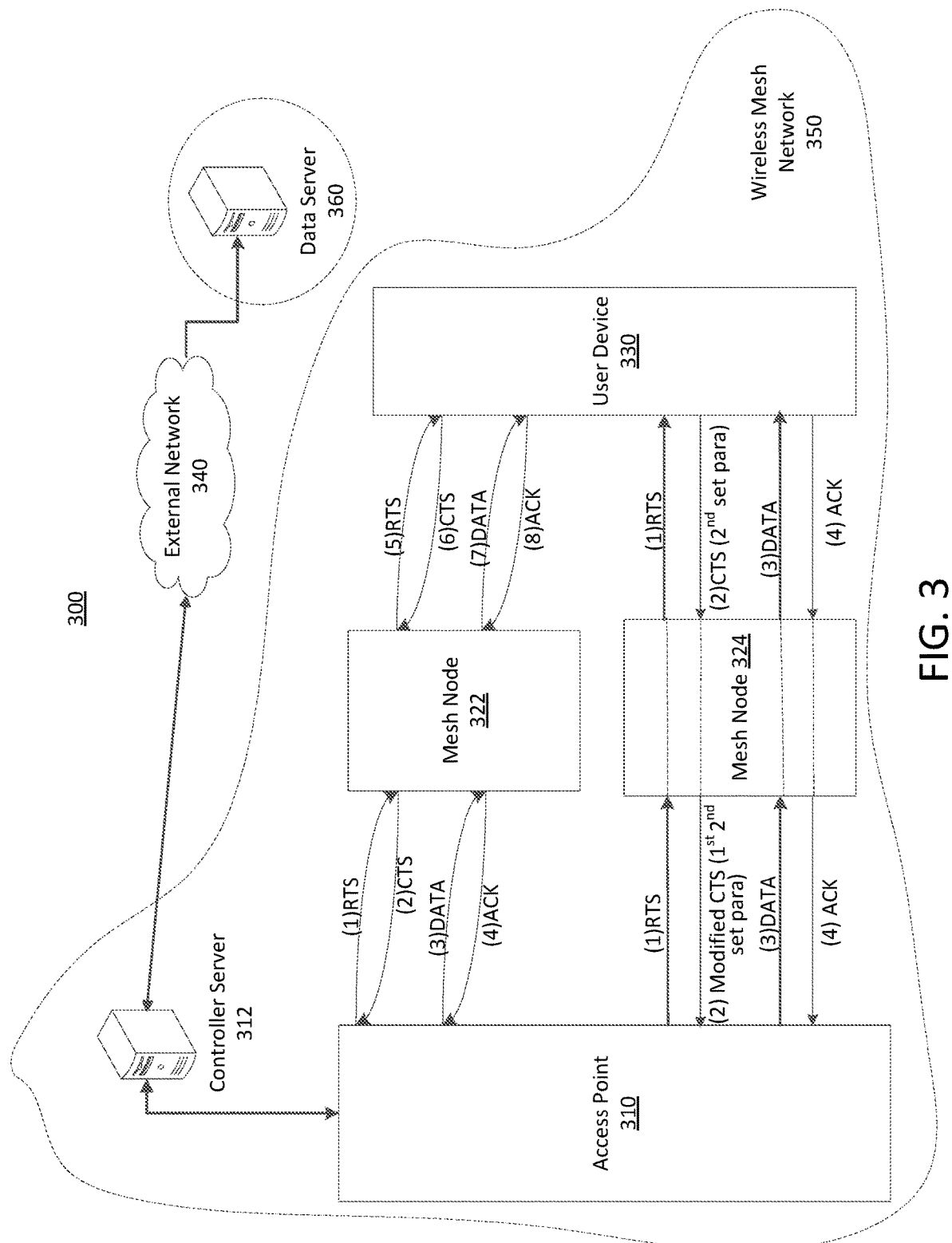
FIG. 3 shows an example of a network shown in FIG. 1, with additional elements for the wireless mesh network.

FIG. 3 shows an example system for path optimization in a wireless mesh network. System 300 may transmit any desired type of data, such as movies, audio and/or video programs, advertisements, emergency notifications, interactive pages (e.g., Internet or web pages), or any other desired audio and/or video content between a wireless mesh network 350 and an external network 340. The wireless mesh network 350 may be located in a premises 102 as shown in FIG. 1, and/or the premises 102 may comprise one node in a larger mesh network spanning a neighborhood, office building, etc. The wireless mesh network 350 may include an access point 310, which may be an access point 127 as shown in FIG. 1. The access point 310 may communicate with a controller server 312 (e.g., a controller server 115 in FIG. 1), which in turn may connect to the external network 340. A data server 360, for example, may be a content server 106 as shown in FIG. 1, and may be connected to the controller server 312 via the external network 340, and the various user devices (not shown) in the wireless mesh work 350 may receive various data frames from the data server 360 via the access point 310 and one or more mesh nodes such as mesh nodes 322 and 324. For example, user device 330, which may include laptop computers, set-top boxes, DVRs, smartphones, and other computing devices (e.g., devices 110-117 in FIG. 1) and may receive Internet data, web sites, audio and/or video content streams (e.g., NBC, ESPN, Video on Demand), and any other desired data, from the access point 310. The access point 310 may in turn receive the content from one or more other sources of the data server 360 via one or more external networks 340.

A packet collision may occur if nodes send more than one packet at a time on a channel, resulting in neither data packet being correctly received. Wireless network contention protocols may be used for carrier transmission in networks using the 802.11 standard, such as Carrier Sense Multiple Access with Collision Avoidance (CSMA/CA) protocol. To avoid such collisions and before transmitting real data to a target user device, a source node, such as the access point 310, may send pre-emptive messages to listen for any collision scenarios in and the network and to ensure the intended recipient is ready to accept data frames. The pre-emptive messages may be in the form of control frames, such as a request to send (RTS) frame, a clear to send (CTS) frame, or an acknowledgement (ACK) frame. The pre-emptive messages may be much smaller in size than the actual data frames.

In the lower portion of FIG. 3, the path via the mesh node 324 may have the following operations. At step (1), the access point 310 may send a RTS to the mesh node 324, and after the mesh node 324 receives the RTS, the mesh node 324 may refrain from sending an immediate CTS response to the access point 310 even there may be a clear channel between the access point 310 and the mesh node 324. The mesh node 324 may generate a first set of transmission parameters indicating the channel conditions (such as signal strength data) between the access point 310 and the mesh node 324. The mesh node may also delay sending the first set of transmission parameters to the access point 310. Rather, the mesh node 324 may relay the RTS to the user device 330. The relayed RTS may be the same or different from the original RTS received from the access point 310.

At step (2), after receiving the RTS relayed from the mesh node 324, the user device 330 may send a CTS to the mesh node 324 to indicate a successful receipt of the relayed CTS. In the CTS message, the user device 330 may include a second set of transmission parameters that indicate the channel conditions (such as signal strength data) between the mesh node 324 and the user device 330. After receiving the first CTS from the user device, the mesh node 324 may append the first set of transmission parameters (indicating the channel conditions (such as signal strength data) between the access point 310 and the mesh node 324) to the CTS to generate a modified CTS. The mesh node 324 may send this modified CTS with the accumulated first and second set of transmission parameters to the access point 310. The accumulated transmission parameters may be transmitted in a field of the CTS or the transmission parameters may be transmitted in a message independently from the CTS.

At step (3), after receipt of the CTS with the accumulated transmission parameters indicating there may be a clear channel along the entire path from the source node (the access point 310) to the target node (the user device 330), the access point 310 may send data to the mesh node 324, which in turn may relay the data to the user device 330.

At step (4), after the user device 330 receives the data, it may send an ACK to the mesh node 324, which may subsequently relay the ACK to the access point 310.

As shown in upper portion of FIG. 3, the path via the mesh node 322 shows another approach for transmission the preemptive messages and data, which may include the following operations. The mesh node 322 may use a Distributed Coordination Function (DCF) protocol as defined in IEEE 802.11standard, and 802.11 wireless network protocol may use a carrier sensing multiple access with collision avoidance (CSMA/CA) medium access control (MAC) protocol. The mesh node 322 may use the carrier sensing mechanism in the DCF protocol with a four way handshake between the access point 310 and the mesh node 322; and another four way handshake between the mesh node 322 and the user device 330 to prevent packet collisions.

At step (1), the access point 310 may initiate a RTS to the mesh node 322, and in response, at step (2) the mesh node 322 may send a clear to send (CTS) message to the access point 310 indicating a clear channel. The access point 310 may then, at step (3) send data frames to the mesh node 322 and in response at step (4), the mesh node 322 may send an acknowledgement (ACK) to the access point 310. Subsequently at step (5), the mesh node 322 may initiate a RTS to the user device 330, which may send a CTS to the mesh node 322 at step (6). Upon receiving the CTS, at step (7) the mesh node 322 may send a data frame to the user device 330 and finally at step (8) the user device 330 may send an ACK to the mesh node 322. Due to the excessive messaging via the mesh node 322, this implementation may require ample storage in non-volatile RAM of the mesh node and this configuration may experience problems if the mesh node 322 participates in a multi-path scenario supporting other user devices. In this approach, the memory of the mesh node 322 may be consumed rapidly and the utilization may be high for both network processor and WIFI chipset, resulting in dropped frames and less optimal user experiences.

Figure 4:
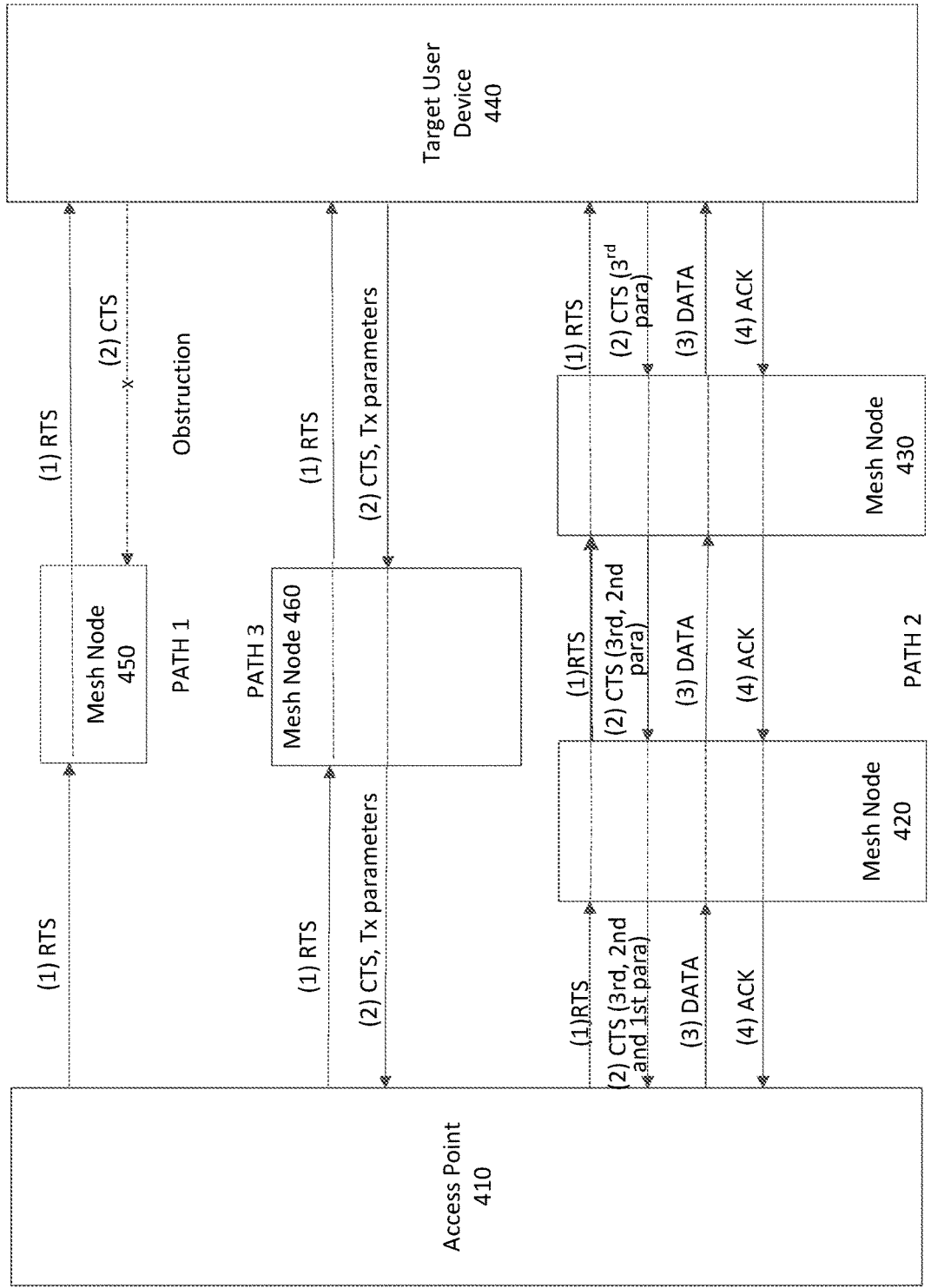
FIG. 4 shows an example mesh network with a network path having multiple hops between an access point and a target mobile device.

The access point 310 may communicate with multiple mesh nodes to reach a target mobile device, as shown in FIG. 4. FIG. 4 shows, in the lower portion, an example mesh network with a network path PATH 2 having multiple hops (via mesh nodes 420 and 430) between an access point 410 and a target mobile device 440. At step (1) the access point 410 may send a RTS message to the mesh node 420 and may request the mesh node 420 to relay the RTS message. The RA field of the RTS message may contain a MAC address of the target user device. As indicated by the RA field, the mesh node 420 may relay the RTS to the mesh node 430, with the TA field containing the MAC address of the mesh node 420 and RA field containing the MAC address of the target user device. After receiving the RTS, the mesh node 430 may relay the RTS message to the target user device 440, wherein the TA field of the RTS containing the MAC address of the mesh node 430 and RA field containing MAC address of the target user device 440. The relayed RTS may be the same or different from the original RTS received from the access point 410. As the access point 410 may generate and send the RTS to the mesh node 420, a bit or field in the RTS frame may be set to indicate this is a relay message. After the RTS is received by the mesh node 420, the mesh node 420 may modify the RTS frame and set a bit to indicate this is again a relay message, and may send the RTS to the mesh node 430. Upon receiving the RTS, mesh node 430 may modify the RTS frame to set a bit to indicate a direct response is requested, send the RTS to the target user device 440 and wait for a response.

In step (2), after receiving the RTS message, the target user device 440 may generate a CTS message to indicate a successful receipt of the RTS, append a third set of transmission parameters associated with the channel conditions between the mesh node 430 and the target user device 440, and send the CTS to the mesh node 430. After receiving the CTS, the mesh node 430 may append a second set of transmission parameters associated with the channel conditions between the mesh nodes 420 and 430, and send the CTS to the mesh node 420. As illustrated in FIG. 4, the CTS may be transmitted via the mesh node 420, where the mesh node 420 may append a first set of transmission parameters associated with the channel conditions between the access point 410 and the mesh nodes 420, and the CTS may arrive at the access point 410 with three sets of transmission parameters. Similar to the RTS message, the CTS may use the RA field to indicate the destination of the CTS is the MAC address of the access point 410. The target user device 440 and the mesh node 430 may set a bit or a field in the CTS to indicate this is a relay message. The mesh node 420 may set a bit or a field in the CTS to indicate that the CTS to be sent to the access 410 is not a relay message. The target user device 440 and the mesh node 430 may set a bit or a field in the CTS frame to indicate this is a relay message, while the mesh node 420 may set a bit or a field in the CTS frame to indicate that the CTS to be sent to the access point 410 is not a relay message. As such, the CTS may be sent to the access point 410 as a final destination.

The above discussion merely provides examples, and many variations may be made. For example, while FIG. 4 illustrates that the access point 410 sends the RTS message to the target user device 440 via intermediate mesh nodes 420 and 430, the target user device 440 may also generate and send the RTS to the access point 410 in the same fashion via these intermediate nodes (not shown) Likewise, in response, the access point 410 may send the CTS to the target user device 440 via the intermediate mesh nodes and the data frames may be transmitted from the target user device 440 to the access point 410 and as a result, the ACK may be transmitted from the access point 410 to the target user device 440.

FIG. 4 may contain more than two intermediate mesh nodes (including the mesh nodes 420 and 430), and the pre-emptive messages and data may be relayed via these intermediate mesh nodes in the same fashion as via mesh nodes 420 and 430 as illustrated in FIG. 4.

In the upper portion, FIG. 4 illustrates an alternative path PATH 1 between the access point 410 and the target user device 440, via one intermediate node the mesh node 450. The mesh node 450 may behave similarly as the mesh nodes 420 and 430. At step (1), the access point 410 may send a RTS message to the mesh node 450 and may request the mesh node 450 to relay the RTS. After receiving the RTS, the mesh node 450 may relay the RTS to the target user device 440. However, after receiving the RTS, the target user device 440 may fail to reply with a CTS, indicating there may be local interference and/or an obstruction between the target user device 440 and the mesh node 450. The mesh node 450 may keep waiting for the CTS to arrive until an expiration threshold has been reached, the mesh node 450 may generate its own pre-emptive message with an indication of the point of failure at the target user device 440 along the path, and the mesh node 450 may append a fourth set of transmission parameters, associated with the channel conditions between the access point 410 and the access point 450, to the message and send the message to the access point 410.

After receiving the pre-emptive messages from PATH 1 and PATH 2, the access point 410 may be made aware that there is a point of failure at PATH 1, and may decide that PATH 2 may be a more optimal path for data transmission. In cases where there may be multiple paths with clear channels, the access point 410 may compare the transmission parameters associated with each path and determine a more optimal path.

For example, a third path PATH 3 may exist between the access point 410 and the user device 440. As the access point 410 attempts to transmit signals to the user device 440, given there is a point of failure at PATH 1, there may be two other potential network paths: PATH 3 between the access point 410 and the user device 440 via mesh node 460; and PATH 2 between the access point 410 and the user device 440 via mesh nodes 420 and 430. The mesh nodes 420, 430 and 450 may perform Clear Channel Assessment (CCA) to determine whether the channels are ready and able to transmit data, and assess noise as part of their radio management trait. Along PATH3, the mesh node 460 may receive the RTS from the access point 410 and may combine the RTS with the information obtained via the CCA to generate a modified RTS. If the mesh node 460 determines the channels are clear, it may relay the modified RTS to the user device 440. The user device 440 may respond with a CTS with the metrics (such as a second set of transmissions indicating the channel conditions between the user device 440 and the mesh node 46) and the mesh node 460 may relay the CTS with additional metrics (such as first and second set of transmission parameters, and the first set of transmission parameters indicating the channel condition between the mesh 460 and the access point 410) to the access point 410.

The access node 410 may store the metrics related to PATH 2 and PATH3 in a non-volatile random-access memory. Based on the stored metrics, the access node 410 may select an optimal network path with the least collisions. For example, PATH 3 may have a signal strength of −60 dB with a data rate of Modulation and Coding Scheme (MCS) value 7, while PATH 2 may have a signal strength of −50 dB with a data rate of MCS 8. The access node 410 may determine that PATH 2 may be a more optimal path to the user device 440. The same transmission algorithm may work from both directions, from the access node to the user device, or from the user device to the access node.

After the access point 310 determines that PATH 2 is an optimal path, then in step (3), the access point 410 may send a data frame to the mesh node 420 and the data frame may be transmitted via mesh node 430 to arrive at the target user device 440. Similar to the RTS or CTS control frames, the data frames may contain a TA and a RA field to indicate the MAC addresses of the source and target nodes. The data frames may use a bit or a field in the data frame to indicate whether the data frames may be relayed to the next node on the transmission path.

In step (4), after the target user device 440 receives the data frame, the target user device 440 may send an ACK message to the access point 410, via the intermediate mesh nodes 430 and 420.

Figure 5:
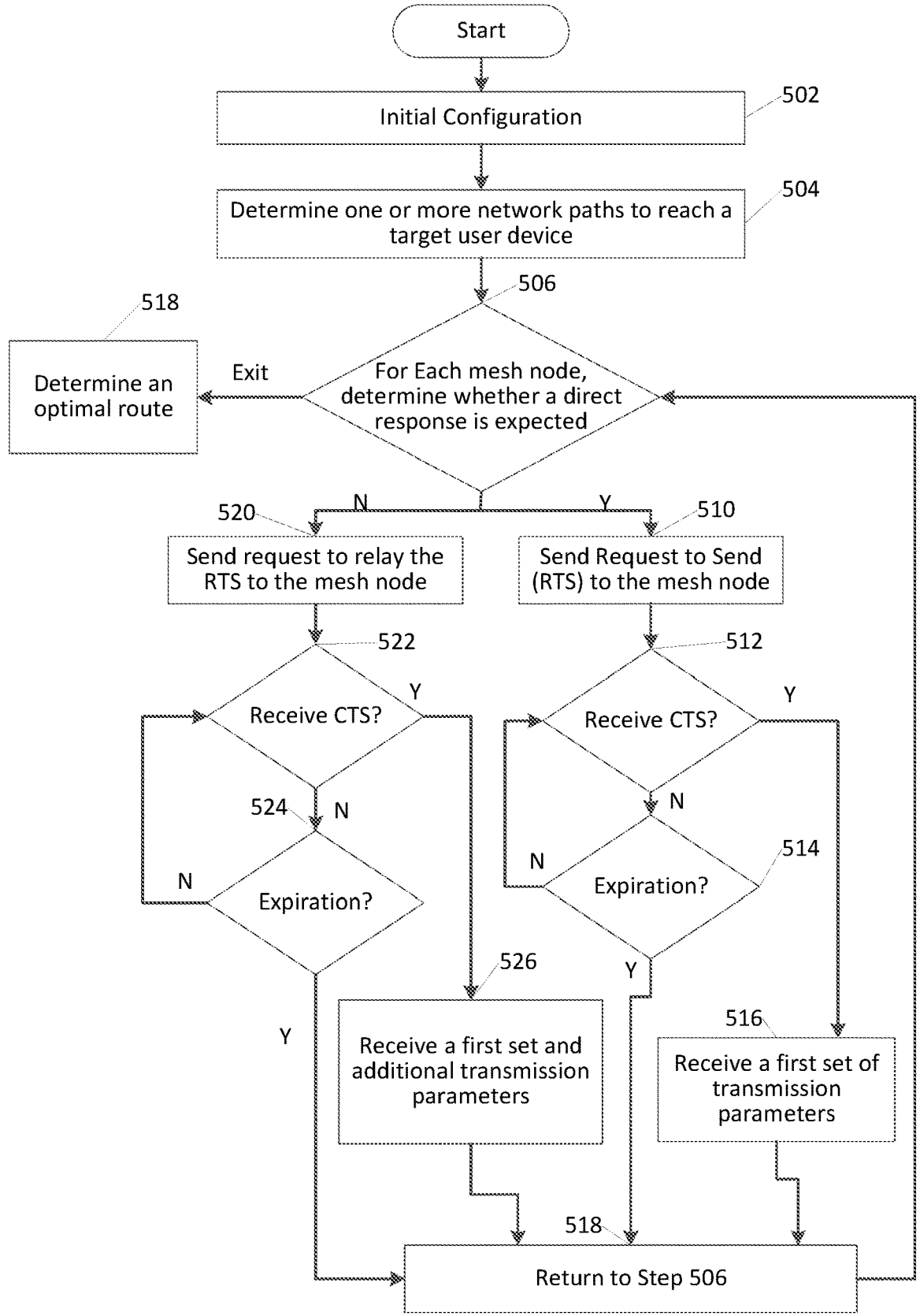
FIG. 5 shows an example algorithm that may be performed by an access point to implement the path optimization.

FIG. 5 shows an example algorithm that may be performed by the access points 310 and 410 and/or the controller 312 to determine lease collision. In step 502, an initial configuration may be performed. The initial configuration may include, for example, determining the various data servers 360 in the external network, the topology of the controller server, the access point, the mesh nodes and the user devices in the wireless mesh network, the initial transmission parameters for the channels that the control frames and data frames to be transmitted, the types of the mesh nodes (direct response v. relay type), and the configuration of the various user devices, etc.

In step 504, one or more network paths from the source node (e.g. the access point) to reach a target user device via one or more mesh nodes may be determined. The access point may obtain the network paths via the topology information gathered during initial configuration at step 502. In obtaining the network paths to the user device, the access point may identify the various intermediate mesh nodes on the network path, the characteristics of each intermediate mesh node and the type of the response the intermediate mesh nodes may generate.

In step 506, a loop may begin for each mesh node determined in step 504. In the loop, the access point may determine whether a direct response is expected. For example, when sending a RTS message, the access point may expect a direct response from the mesh node as well as some transmission parameters indicating the channel condition between the access point and the mesh node. The access point may expect that the mesh node to relay the RTS to the target user device, and to relay the transmission parameters reflecting the channel conditions between the target user device and the mesh node.

If the access point may expect a direct response from the mesh node (step 506=Y), the process may go to process 510, where the access point may send a request to send the RTS to the mesh node for a direct response. This may be done, for example, using a bit or a field in the RTS frame to indicate that a direct response is expected from the mesh node. In some situations, a RA field in the RTS message may be set to a MAC address of the mesh node, indicating the mesh node as the destination and a direct response is expected from the mesh node.

In step 512, a determination may be made whether a clear to send (CTS) message is received from the mesh node. If the access point receives the CTS (step 512=Y) indicating a clear channel between the access point and the mesh node, the process may go to step 516. In step 516, a first set of transmission parameters from the mesh node that reflect the channel conditions between the access point and the mesh node may be transmitted to the access point. For example, the transmission parameters may include one or more of a modulation rate, a packet size, a data rate, a Received Signal Strength Indication (RSSI) or a Signal to Noise Ratio (SNR), etc.

After completion of step 516, the process may return to step 506 to examine the next mesh node on the network paths leading to the target user device. If there is no more mesh node to examine, the loop may exit and the process may proceed to step 518 to determine an optimal route between the access point and the target user device via one or more intermediate mesh nodes. For example, if the access point requests a direct response from the mesh nodes A and B respectively, and the mesh nodes may respond with the CTS with the first and second sets of transmission parameters. These transmission parameters may be compared and a determination may be made, for example, that the route via mesh node A may have a higher data rate or signal strength, indicating that the channel via mesh node A may be more robust than the channel via mesh node B. In this situation, the network path via mesh node A may be selected as the optimal path to reach the target user device.

If the access point does not receive the CTS from the mesh node (step 512=N), the process may go to step 514 and a determination may be made whether an expiration time has been reached. The expiration time may be a value carried in the RTS message or a predetermined value set by the access point in the initial configuration in step 502. If the expiration time has not been reached (step 514=N), the process may return to process 512 to determine whether a CTS has received. If the expiration time has been reached (step 514=Y), the process may proceed to step 506 to examine the next mesh node on the network paths leading to the target user device. If there is no more mesh node to examine, the loop may exit and the process may proceed to step 518 for a determination of an optimal route between the access point and the target user device via one or more intermediate mesh nodes. If the access point requests a direct response from the mesh nodes A and B respectively, and the mesh node A may respond with a CTS, thereby indicating a clear channel with the first set of transmission parameters, while the mesh node B may reach the expiration time and fail to respond with the CTS indicating that the path between the access point and the mesh node B may not have a clear channel. The mesh node B may excluded from consideration and the route via mesh node A may be selected as the optimal route.

Referring back to step 506, if a determination is made that a relay response is expected in lieu of a direct response (step 506=N), the process may proceed to step 520, where a RTS message may be sent to the mesh node and to relay the message to the target user device. This may be done, for example, using a bit or a field in the RTS frame to indicate that the access point may expect the mesh node to perform a relay of the RTS. A RA field in the RTS message may be set to a MAC address of the target user device, indicating the target user device as the destination and the RTS may be relayed by the mesh node. If a network path contains multiple intermediate mesh nodes between the access node and the target user device, the RTS may be relayed to the downstream mesh nodes along the network path, until the RTS reaches the target user device.

In step 522, a determination may be made whether a CTS has been received. If there is one mesh node between the access node and the target user device, and the access point receives the CTS from the mesh node (step 522=Y) indicating a clear channel between the target user device and the mesh node, and a clear channel between the access point and the mesh node, the process may go to step 526, where a first set and additional (e.g., a second set of) transmission parameters may be received from the mesh node. For example, after the mesh node relays the RTS to the target user device, the target user device may send the CTS to the mesh node and the mesh node may modify the CTS and send the modified CTS to the access point. The target user device may generate a second set of transmission parameters indicating the channel conditions between the target user device and the mesh node, and may send the second transmission parameters to the mesh node together with the CTS; the mesh node may generate a first set of transmission parameters indicating the channel conditions between the access point and the mesh node, modify the CTS with the accumulated first and second set of transmission parameters, and send the modified CTS with the accumulated transmission parameters to the access point.

In step 522, if there are multiple mesh nodes (e.g., the mesh nodes 420 and 430) between the access node and the target user device, and after the mesh node relays the RTS to the target user device, the target user device may send the CTS to the mesh node 430. The target user device may generate a second set of transmission parameters indicating the channel conditions between the target user device and the mesh node 430, and may send the second transmission parameters to the mesh node 430 together with the CTS. Subsequently, the mesh node 430 may generate a third set of transmission parameters indicating the channel conditions between the mesh nodes 430 and 420. The mesh node 430 may modify the CTS from the target user device with the third set of transmission parameters, and send the modified CTS with accumulated second and third sets of transmission parameters to the mesh node 420. In turn, the mesh node 420 may generate a first set of transmission parameters indicating the channel conditions between the access point and the mesh node 420, modify the CTS with the accumulated first, second and third sets of transmission parameters, and send the modified CTS with the accumulated transmission parameters to the access point. In this case, after the access point receives the CTS from the downstream mesh node 420 (step 522=Y) indicating a clear channel between the target user device and the access point via both the mesh nodes 430 and 420, the process may go to step 526, where a first, second and third sets of transmission parameters may be received from the downstream mesh node 420.

After receiving the transmission parameters at the access point in step 526, the process may return to step 506 to examine the next mesh node on the list of mesh nodes that may lead to the target user device.

If the access point does not receive the CTS from the mesh node (step 522=N), the process may proceed to step 524 and a determination may be made whether an expiration time has been reached. Similar to the expiration time in step 514, the expiration time of step 524 may be a value carried in the RTS message or a predetermined value set by the access point in the initial configuration in step 502. Step 524 may have a longer expiration time than that in step 514, given that the CTS may travel multiple hops before reaching the access point, while the CTS may travel a single hop in the direct response fashion of step 514.

In step 524, if the expiration time has not been reached, (step 524=N), the process may return to step 522 to determine whether the CTS has received. If an expiration time has been reached (step 524=Y), the process may proceed to step 506 to examine the next mesh node on the network paths leading to the target user device. If there is no more mesh node to examine, the loop may exit and the access point may proceed to step 518 to determine an optimal route between the access point and the target user device via one or more intermediate mesh nodes. If the access point sends the RTS to the mesh nodes A and B respectively for further relay, the mesh node A may respond with a CTS indicating a clear channel with a first and second sets of transmission parameters, but the mesh node B may reach the expiration time and fail to respond with the CTS, thereby indicating that the path between the access point and the mesh node B does not have a clear channel and/or that the path between the mesh node B and the target user device may not have a clear channel. The mesh node B may be excluded from consideration and the route via mesh node A may be selected as the optimal route.

In step 518, if the access point receive CTS messages from multiple mesh nodes associated with different paths to the target user device, the transmission parameters associated with each path may be compared, and an optimal path may be selected based on the corresponding transmission parameters. Supposing that in a wireless mesh network, two mesh nodes may be out of range from each other, and these nodes may be hidden from each other and so they may not be able to detect a collision when transmitting data frames. Based on the CTS messages and the corresponding transmission parameters relayed from the mesh nodes to an access node, a least disruptive path may be selected to address the hidden node problem.

Figure 6:
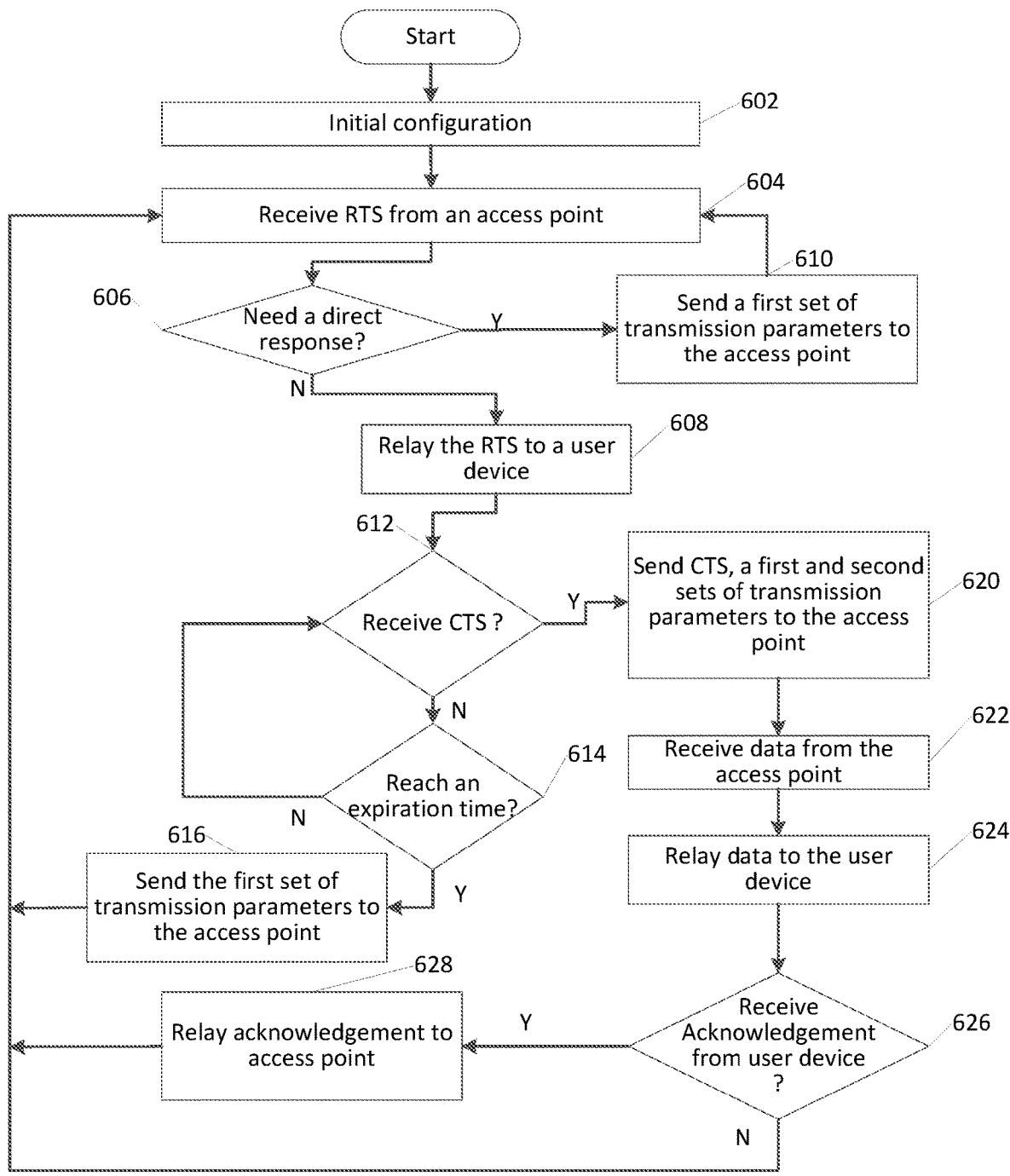
FIG. 6 shows an example algorithm that may be performed by a mesh node to implement path optimization.

FIG. 6 shows an example algorithm that may be performed by a mesh node to determine the route optimization as discussed above. Beginning in step 602, the mesh node may be configured for operation. This configuration may entail a variety of steps depending on the mesh node type. For example, a laptop, smart phone or wireless router may support an ad-hoc mode, allowing these devices to connect directly, and may establish initial communications with an access point, which may in turn begin communicating with a controller. The mesh node may also establish communications with a client device, which also may also be referred as a wireless client or a station. The mesh node may be provisioned for services such as exchanging control frames and data frames as an intermediate node between the access point and the user device. The mesh node may receive and store topology information indicating connectivities of the mesh node with one or more access points, the user devices or other mesh nodes.

The configuration may include configuring the mesh node to identify one or more predetermined types of messages and the protocols to relay such messages. For example, the mesh node may receive control frames as defined under IEEE 802.11 DCF protocol, and the control frames may include a RTS frame, a CTS frame, or an ACK frame. The mesh node may be also configured to relay data frames.

The mesh node may generate and store transmission parameters related to the initial channel conditions between the mesh node and the access point, and between the mesh node and the user device. The transmission parameters may include one or more of a modulation rate, a packet size, a data rate, a Received Signal Strength Indication (RSSI), or a Signal to Noise Ratio (SNR). The mesh node may receive the transmission parameters in the CTS and may be configured to check such transmission parameters in the CTS from a downstream node. The mesh node may also monitor and append additional transmission parameters to the CTS, after it receives the CTS from the downstream node.

In step 604, a RTS may be received from a preceding node, such as an access point or an upstream mesh node. The RTS may contain the following fields: a Frame Control, a Duration, a Receiver Address (RA), a Transmitter Address (TA) and a Frame Check Sequence (FCS). The TA filed may indicate a MAC address of the access node where the RTS is originated and the RA field may indicate a MAC address of a target user device for a destination of the RTS. The RA field may include a MAC address of a mesh node, indicating the mesh node as the destination of the RTS. The mesh node may, in step 606, determine whether a direct response is to be sent. For example, the mesh node may examine the RTS to identify an appropriate action in response to the RTS.

After receiving the RTS, the mesh node may examine the RA field information noted above in step 604. If the RA field contains a MAC address pointing to the mesh node, this may indicate that the access point requests a direct response from the mesh node (step 606=Y); the process may proceed to step 610, where the mesh node may collect a first set of transmission parameters that reflect the channel condition between the mesh node and access point, and the mesh node may send the first set of transmission parameters to the access point.

In step 606, if the RA field contains a MAC address of a target user device, this may indicate that the access point does not request a direct response (step 606=N) at this time; the process may proceed to step 608, where the mesh node may relay the CTS to the target user device as indicated by the MAC address.

Following step 608, where the RTS may be relayed to the user device, the process may proceed to step 612 to determine whether a CTS message is received from the user device. The CTS message may include a Frame Control field, a Duration field, a Receiver Address (RA), and a FCS field; and the RA field may indicate the MAC address of the destination node to receive such CTS frame.

If the mesh does not receive the CTS from the user device (step 612=N), the process may proceed to step 614 to determine whether an expiration time has been reached. The mesh node may extract the information from a Duration field from the RTS, and the Duration field may contain an interval value in µs of time to transmit the RTS frame. The expiration time may be based on such interval as extracted from the RTS. If the time interval has reached the expiration threshold (step 614=Y), the process may proceed to step 416, and the mesh node may send the first set of transmission parameters reflecting the channel conditions between the mesh node and the access point to the access point. After sending the transmission parameters in step 616, the process may return to step 604 waiting for receiving the next RTS from the access point.

If the mesh node receives the CTS (step 612=Y), the RA field may indicate the MAC address of the access point, and the process may proceed to step 620, where the CTS may be modified and sent to the access point. The mesh node may collect the first set of transmission parameters that reflect the channel conditions between the mesh node and the access point. The mesh node may receive, from the user device, a second set of transmission parameters that reflect the channel conditions between the mesh node and the user device. The mesh node may modify the CTS with the accumulated first and second set transmission parameters and send the modified CTS to the access point.

Following step 620 where the mesh node may relay the modified CTS to the access point, the process proceeds to step 622, and the mesh node may receive a data frame from the access point. The access point may receive the CTS and initiate the data transmission to the user device via the mesh node. Similarly, the data frame may contain the RA and TA fields, with the RA indicating the MAC address of the destination node. If the RA field in the data frame indicates the MAC address of the user device, the mesh node may relay the data frame to the user device in step 624.

In step 626, the mesh node may determine whether an acknowledgement (ACK) message has been received from the user device. The ACK may contain a Frame Control field, a Duration field, a Receiver Address (RA) field and a Frame Check Sequence (FCS) field. The RA field of the ACK frame may indicate the MAC address of the access point as the destination of the ACK frame to be transmitted. Upon receiving the ACK message (step 626=Y), the process may proceed to step 628, where the ACK frame may be relayed to the access point. Subsequently, the process may return to step 604 to wait for the access point to issue the next RTS message.

If the mesh node does not receive ACK from the user device (step 626=N), the mesh node may return to step 604 to wait for the access point to issue the next RTS message. The mesh node may generate an updated first set of transmission parameters that reflect the channel conditions between the mesh node and the access point and send the updated first set of transmission parameters to the access point.

Figure 7:
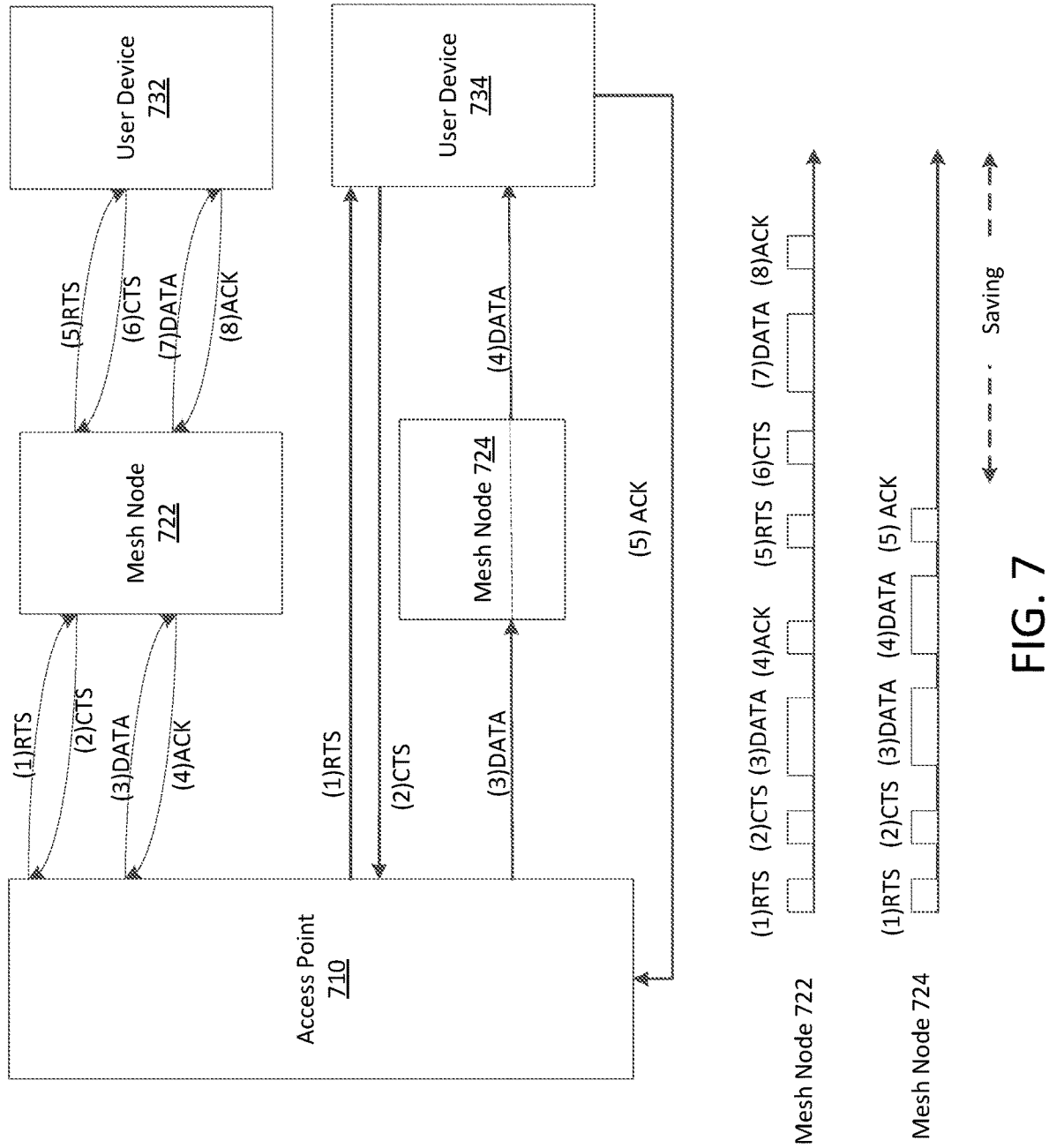
FIG. 7 shows an example mesh network with network paths between an access point and multiple target user devices.

FIG. 7 shows an example mesh network with network paths between an access point and multiple user devices. In this example of FIG. 7, access point 710 may attempt to transmit to both user devices 732 and 734. The network path via mesh node 722 to the user device 732, is illustrated in the upper portion of FIG. 7. The mesh node 722 may be similar to the mesh node 322, as illustrated in the upper portion of FIG. 3, which may employ a traditional approach that includes eight steps of operation. The network path via mesh node 724 to the user device 734, is illustrated in the lower portion of FIG. 7. In contrast, only five steps of operation may be performed, where the user device 734 may hear RTS from the access node 710 and send CTS to the access node 710 directly. At step (1), a RTS may be sent from the access node 710 to the user device 734 directly, and the user device 734 may, at step (2), reply with a CTS to the access node 710 directly. At step (3), the access node 710 may send DATA to the mesh node 724 and at step (4), the mesh node 724 may relay DATA to the user device 734. At step (5), the user device 734 may send an ACK to the access node 710. Comparing the two network paths via the mesh nodes 722 and 724, respectively, the access point 710 may determine that the path via the mesh node 724 may be more optimal, due to the saving of the three steps as shown in FIG. 7.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

The invention claimed is:

1. A method comprising:
    receiving, by a computing device in a mesh network and from an access point, a first request to send (RTS) message, wherein the first RTS message indicates a target mobile device;
    prior to sending a first clear to send (CTS) message in response to the first RTS message, sending, by the computing device to the target mobile device, a second RTS message based on the first RTS message;
    receiving, from the target mobile device and after sending the second RTS message, a second CTS message and a first transmission parameter indicating a channel condition between the target mobile device and the computing device;
    sending, by the computing device and to the access point, a CTS message comprising the first transmission parameter;
    receiving, from the access point and after sending the CTS message comprising the first transmission parameter, data to be transmitted to the target mobile device; and
    sending, by the computing device, the data to the target mobile device.

2. The method of claim 1, wherein sending the CTS message comprising the first transmission parameter further comprises:
    generating, by the computing device, a second transmission parameter indicating a channel condition between the access point and the computing device; and
    sending, to the access point, the second transmission parameter.

3. The method of claim 2, wherein the CTS message comprising the first transmission parameter further comprises the second transmission parameter.

4. The method of claim 2, wherein the first transmission parameter and the second transmission parameter are transmitted separately.

5. The method of claim 1, wherein the first RTS message and the second RTS message each comprises a frame control field, a duration field, a Receiver Address (RA) field, a Transmitter Address (TA) field and a Frame Check Sequence (FCS) field.

6. The method of claim 1, wherein the first RTS message and the second RTS message each comprises a Receiver Address (RA) field, the method further comprising:
    determining an address of the target mobile device based on the RA field of the first RTS message.

7. The method of claim 1, wherein the first RTS message and the second RTS message each comprises a Transmitter Address (TA) field, the method further comprising:
    determining an address of the access point based on the TA field of the first RTS message.

8. The method of claim 1, wherein the first RTS message and the second RTS message each comprises a Receiver Address (RA) field, and wherein the RA field in the first RTS message is the same as the RA field in the second RTS message.

9. The method of claim 1, wherein the first transmission parameter comprises one or more of: a modulation rate, a Received Signal Strength Indication (RSSI) or a Signal-to-Noise Ratio (SNR).

10. The method of claim 1, further comprising:
    receiving, from the access point, a third RTS message;
    sending, by the computing device and to the target mobile device, a fourth RTS message;
    determining, after a predetermined period of time, that a third CTS message was not received from the target mobile device; and
    sending, by the computing device and to the access point, an updated transmission parameter indicating a status of connectivity between the computing device and the access point.

11. A system comprising:
    an access point; and
    a computing device of a plurality of computing devices in a mesh network,
    wherein the computing device is configured to:
        receive, from the access point, a first request to send (RTS) message, wherein the first RTS message indicates a target mobile device;
        prior to sending a first clear to send (CTS) message in response to the first RTS message, send, to the target mobile device, a second RTS message based on the first RTS message;
        receive, from the target mobile device and after sending the second RTS message, a second CTS message and a first transmission parameter indicating a channel condition between the target mobile device and the computing device;
        send, to the access point, a CTS message comprising the first transmission parameter;

receive, from the access point and after sending the CTS message comprising the first transmission parameter, data to be transmitted to the target mobile device; and send, to the target mobile device, the data.

12. The system of claim 11, wherein the computing device is further configured to send the CTS message comprising the first transmission parameter by:

generating a second transmission parameter indicating a channel condition between the access point and the computing device; and sending, to the access point, the second transmission parameter.

13. The system of claim 12, wherein the CTS message comprising the first transmission parameter further comprises the second transmission parameter.

14. The system of claim 12, wherein the first transmission parameter and the second transmission parameter are transmitted separately.

15. The system of claim 11, wherein the first RTS message and the second RTS message each comprises a frame control field, a duration field, a Receiver Address (RA) field, a Transmitter Address (TA) field and a Frame Check Sequence (FCS) field.

16. The system of claim 11, wherein the first RTS message and the second RTS message each comprises a Receiver Address (RA) field, and wherein the computing device is further configured to:

determine an address of the target mobile device based on the RA field of the first RTS message.

17. The system of claim 11, wherein the first RTS message and the second RTS message each comprises a Transmitter Address (TA) field, and wherein the computing device is further configured to:

determine an address of the access point based on the TA field of the first RTS message.

18. The system of claim 11, wherein the first RTS message and the second RTS message each comprises a Receiver Address (RA) field, and wherein the RA field in the first RTS message is the same as the RA field in the second RTS message.

19. The system of claim 11, wherein the first transmission parameter comprises one or more of: a modulation rate, a Received Signal Strength Indication (RSSI) or a Signal-to-Noise Ratio (SNR).

20. The system of claim 11, wherein the computing device is further configured to:

receive, from the access point, a third RTS message;

send, to the target mobile device, a fourth RTS message;

determine, after a predetermined period of time, that a third CTS message was not received from the target mobile device; and send, to the access point, an updated transmission parameter indicating a status of connectivity between the computing device and the access point.

21. A non-transitory computer-readable medium storing instructions that, when executed, cause:

receiving, by a computing device in a mesh network and from an access point, a request to send a first request to send (RTS) message, wherein the first RTS message indicates a target mobile device;

prior to sending a first clear to send (CTS) message in response to the first RTS message, sending, by the computing device to the target mobile device, a second RTS message based on the first RTS message;

receiving, from the target mobile device and after sending the second RTS message, a second CTS message and a first transmission parameter indicating a channel condition between the target mobile device and the computing device;

sending, by the computing device and to the access point, a CTS message comprising the first transmission parameter;

receiving, from the access point and after sending the CTS message comprising the first transmission parameter, data to be transmitted to the target mobile device; and sending, by the computing device, the data to the target mobile device.

22. The non-transitory computer-readable medium of claim 21, wherein the instructions, when executed, further cause sending the CTS message comprising the first transmission parameter by:

generating, by the computing device, a second transmission parameter indicating a channel condition between the access point and the computing device; and sending, to the access point, the second transmission parameter.

23. The non-transitory computer-readable medium of claim 22, wherein the CTS message comprising the first transmission parameter further comprises the second transmission parameter.

24. The non-transitory computer-readable medium of claim 22, wherein the first transmission parameter and the second transmission parameter are transmitted separately.

25. The non-transitory computer-readable medium of claim 21, wherein the first RTS message and the second RTS message each comprises a frame control field, a duration field, a Receiver Address (RA) field, a Transmitter Address (TA) field and a Frame Check Sequence (FCS) field.

26. The non-transitory computer-readable medium of claim 21, wherein the first RTS message and the second RTS message each comprises a Receiver Address (RA) field, and wherein the instructions, when executed, further cause:

determining an address of the target mobile device based on the RA field of the first RTS message.

27. The non-transitory computer-readable medium of claim 21, wherein the first RTS message and the second RTS message each comprises a Transmitter Address (TA) field, and wherein the instructions, when executed, further cause:

determining an address of the access point based on the TA field of the first RTS message.

28. The non-transitory computer-readable medium of claim 21, wherein the first RTS message and the second RTS message each comprises a Receiver Address (RA) field, and wherein the RA field in the first RTS message is the same as the RA field of the second RTS message.

29. The non-transitory computer-readable medium of claim 21, wherein the first transmission parameter comprises one or more of: a modulation rate, a Received Signal Strength Indication (RSSI) or a Signal-to-Noise Ratio (SNR).

30. The non-transitory computer-readable medium of claim 21, wherein the instructions, when executed, further cause:

receiving, from the access point, a third RTS message;

sending, by the computing device and to the target mobile device, a fourth RTS message;

determining, after a predetermined period of time, that a third CTS message was not received from the target mobile device; and sending, by the computing device and to the access point, an updated transmission parameter indicating a status of connectivity between the computing device and the access point.

* * * * *

UNITED STATES PATENT AND TRADEMARK OFFICE
CERTIFICATE OF CORRECTION

PATENT NO. : 12,089,133 B2  
APPLICATION NO. : 18/458721  
DATED : September 10, 2024  
INVENTOR(S) : Ong et al.

Page 1 of 1

It is certified that error appears in the above-identified patent and that said Letters Patent is hereby corrected as shown below:

In the Specification

In the Detailed Description

Column 3, Line 45:  
Delete "HTMLS," and insert --HTML5,--

Column 6, Line 11:  
Delete "work" and insert --network--

Column 8, Line 44:  
After "(not shown)", insert --.--

Column 9, Line 29:  
Delete "PATH3," and insert --PATH 3,--

Column 9, Line 37:  
Delete "46)" and insert --460)--

Column 9, Line 43:  
Delete "PATH3" and insert --PATH 3--

Signed and Sealed this  
Twenty-third Day of September, 2025

John A. Squires  
*Director of the United States Patent and Trademark Office*